United States Patent
Hsieh et al.

(10) Patent No.: US 8,259,072 B2
(45) Date of Patent: *Sep. 4, 2012

(54) INPUT CONTROL APPARATUS AND AN INTERACTIVE SYSTEM USING THE SAME

(75) Inventors: Chin-Lin Hsieh, Taipei County (TW); Jr-Wei Lian, Taipei County (TW); Shun-Nan Liou, Kaohsiung (TW); Ming-Jye Tsai, Hsinchu County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 1169 days.

This patent is subject to a terminal disclaimer.

(21) Appl. No.: 11/867,768

(22) Filed: Oct. 5, 2007

(65) Prior Publication Data

US 2009/0042649 A1 Feb. 12, 2009

(30) Foreign Application Priority Data

Aug. 10, 2007 (TW) .............................. 96129503 A

(51) Int. Cl.
*G06F 3/02* (2006.01)
*G09G 5/00* (2006.01)

(52) U.S. Cl. ........ 345/169; 348/734; 345/163; 345/158; 345/161; 345/156; 463/30; 463/31; 463/36; 463/43; 463/38; 273/148 B

(58) Field of Classification Search .............. 463/36, 463/37, 39, 30, 31, 38, 43; 345/157–172, 345/156; 348/734; 273/148 B
See application file for complete search history.

(56) References Cited

U.S. PATENT DOCUMENTS 5,138,154 A 8/1992 Hotelling
(Continued)

FOREIGN PATENT DOCUMENTS

CN 1987752 6/2007
(Continued)

OTHER PUBLICATIONS

Taiwan Intellectual Property Office, "Office Action", Aug. 12, 2010, Taiwan.

*Primary Examiner* — Lun-Yi Lao
*Assistant Examiner* — Kelly B Hegarty
(74) *Attorney, Agent, or Firm* — Morris Manning & Martin LLP; Tim Tingkang Xia, Esq.

(57) ABSTRACT

An input control apparatus and an interactive system using the same are disclosed. The input control apparatus comprises: a switch unit, for selecting an input mode for the input control apparatus selected from the group consisting of a mouse mode, a joystick mode, a keyboard mode and the combination thereof; an interface unit, for generating an input signal according to the input mode selected by the switch unit; a remote control unit, for generating and thus transmitting a control signal according to the input mode and the input signal. By transmitting the control signals of two aforesaid input control apparatuses to an electronic device, such as a computer, an interactive gaming device or an interactive multimedia device, two such input control apparatuses can be integrated as a handheld apparatus with a left-hand unit and a right-hand unit for meeting the control requirements of a comparatively more complicated game executing on the electronic device. However, for those less complicated game, the two input control apparatuses can be configured as independent devices to be operated by different users. Thereby, users are able to interact with the electronic device.

12 Claims, 7 Drawing Sheets

U.S. PATENT DOCUMENTS

| | | |
|---|---|---|
| 6,782,245 B1 | 8/2004 | Lazzarotto et al. |
| 2007/0050597 A1 | 3/2007 | Ikeda |
| 2007/0072680 A1* | 3/2007 | Ikeda .............................. 463/43 |

FOREIGN PATENT DOCUMENTS

| | | |
|---|---|---|
| JP | 9297657 | 11/1997 |
| JP | 10039994 | 2/1998 |
| JP | 2000201385 | 7/2000 |
| JP | 2002073273 | 3/2002 |
| JP | 2006345537 | 12/2006 |
| WO | 2004102371 | 11/2004 |

\* cited by examiner

| Mouse input flag | Joystick input flag | Keyboard input flag | Input mode selection |
|---|---|---|---|
| 1 | 0 | 0 | Mouse mode |
| 0 | 1 | 0 | Joystick mode |
| 0 | 0 | 1 | Keyboard mode |
| 1 | 1 | 0 | Mouse+Joystick mode |
| 0 | 1 | 1 | Joystick+Keyboard mode |
| 1 | 0 | 1 | Mouse+Keyboard mode |
| 1 | 1 | 1 | Mouse+Joystick+Keyboard mode |

FIG. 3

INPUT CONTROL APPARATUS AND AN INTERACTIVE SYSTEM USING THE SAME

FIELD OF THE INVENTION

The present invention relates to an input control apparatus and an interactive system using the same, and more particularly, to an input control apparatus capable of switching between a mouse mode, a joystick mode, a keyboard mode and the combination thereof in a manner that two such input control apparatuses can be integrated as a handheld device with a left-hand unit and a right-hand unit while both connecting to an electronic device, such as a computer, an interactive gaming device or an interactive multimedia device and thus forming an interactive system.

BACKGROUND OF THE INVENTION

After developing for years on the high gear, multimedia game enjoys great breakthrough not only in its audio and graphic performances, but also in it animation capability, since the computation abilities of electronic devices relating to multimedia games had been greatly improved which is directly resulted from the recent rapid development of semiconductor industry. Hence, players can now enjoys a multimedia game in a virtual-reality environment full of sounds and images.

Although the fun of playing multimedia games can be greatly enhancing by the improvement of audio/video effect, it is noted that for most multimedia games, conventional input interface, such as keyboard, joystick, or mouse, etc., are still used by players as the control device. In another word, as players can only interact with multimedia games through such conventional handheld input interfaces, the fun of playing multimedia games is reduced.

There are already some techniques for improving such disadvantage. One such technique is a game controller disclosed in U.S. Pub. No. 20070050597, entitled "Game controller and game system". The aforesaid game controller is comprised of: a master control unit; and an auxiliary control unit; wherein the master control unit has more operation buttons that the auxiliary control unit. Moreover, the master control unit can be operated independently in a manner similar to a common remote control, while the auxiliary control unit is only operable when it is electrically connected to the master control unit by a transmission wire and is only used for controlling the movement of a cursor displayed on a game screen. Thus, the aforesaid game controller is short in that: it is unable for the auxiliary control unit to function independently without connecting to the master control unit, and further, the game controller lacks the ability to integrate functions of various input interfaces, such as mouse, keyboard, joystick, etc., into the game controller.

Another such technique is disclosed in U.S. Pat. No. 6,782,245, entitled "Wireless peripheral interface with universal serial bus port". The wireless peripheral interface is used for coupling with a Universal Serial Bus (USB) port for connecting a wireless peripheral with a host computer or controller. Wireless peripheral devices (e.g., keyboard, mouse, trackball, touch pad, joysticks, and game controllers) transmit communication signals to the peripheral interface, which are received and processed into formats suitable for transmission to the host computer or controller via USB. However, the aforesaid interface is still short in that: conventional input devices (e.g., keyboard, mouse, trackball, touch pad, joysticks, and game controllers) are still used as control device for the host computer that the aforesaid wireless peripheral interface lack the ability to integrate all those device coupled to such wireless peripheral interface into one single control device; and thus a game executed on the host computer is played by those conventional mouse, keyboard or joystick that is dull and not lively enough.

Therefore, an inertial sensing input control apparatus is needed for providing users with an integrated operation interface to interact with an electronic device connected thereto.

SUMMARY OF THE INVENTION

The object of the present invention is to provide an input control apparatus capable of switching between a mouse mode, a joystick mode, a keyboard mode and the combination thereof in a manner that two such input control apparatuses can be integrated as a handheld device with a left-hand unit and a right-hand unit for meeting the control requirements of a comparatively more complicated game executing on an electronic device, and moreover, for those less complicated game, the two input control apparatuses can be configured as independent devices to be operated by different users.

To achieve the above object, the present invention provides an input control apparatus, comprising: a switch unit, for selecting one input mode out of at least an input mode for the input control apparatus; an interface unit, for generating at least an input signal according to the input mode selected by the switch unit; and a remote control unit, coupled to the switch unit and the interface unit for generating and thus transmitting a control signal according to the input mode and the at least one input signal.

In an exemplary embodiment of the invention, the input mode of the input control apparatus is a mode selected from the group consisting of a mouse mode, a joystick mode, a keyboard mode and the combination thereof.

In an exemplary embodiment of the invention, the interface unit is coupled to at least an input unit; and the input unit can be a device selected from the group consisting of a cross key, an assembly of a plurality of press buttons, and the combination thereof.

In an exemplary embodiment of the invention, the input control apparatus further comprises: an inertial sensing module, being configured with at least an inertial sensor for sensing at least a control motion and thus correspondingly generating at least an inertial sensing parameter according to the input mode selected by the switch unit. Moreover, the inertial sensing parameter is integrated by the remote control unit into the control signal generated therefrom.

In an exemplary embodiment of the invention, each inertial sensor can be a device selected from the group consisting of a gyroscope, an accelerometer, and the combination thereof.

In an exemplary embodiment of the invention, the input control apparatus further comprises: a receiving unit, for receiving the control signal generated from the remote control unit; an operation unit, coupled to the receiving unit for analyzing the control signal into an operation signal; and an interface connecting unit, for transmitting the operation signal to an electronic device. Moreover, the electronic device can be a device selected from the group consisting of a computer, an interactive gaming device and an interactive multimedia device.

In an exemplary embodiment, the interface unit is electrically connected to the electronic device by a means selected from the group consisting of a wired means and a wireless means; in which the wired means can be enabled by a PS/2 interface, or an USB interface; and the wireless means can be enabled by way of Bluetooth communication, or radio frequency (RF) communication.

Furthermore, to achieve the above object, the present invention provides an inertial sensing input control apparatus, comprising: a switch unit, for selecting one input mode out of at least an input mode for the input control apparatus; an interface unit, for generating at least an input signal according to the input mode selected by the switch unit; an inertial sensing module, being configured with at least an inertial sensor, for sensing at least a control motion and thus correspondingly generating at least an inertial sensing parameter according to the input mode selected by the switch unit; and a remote control unit, coupled to the switch unit, the interface unit and the inertial sensing module for generating and thus transmitting a control signal according to the input mode, the at least one input signal and the at least one inertial sensing parameter.

In an exemplary embodiment, the present invention provides an interactive system, comprising:
at an input control apparatus, each comprising:
a switch unit, for selecting one input mode out of at least an input mode for the input control apparatus;
an interface unit, for generating at least an input signal according to the input mode selected by the switch unit; and
a remote control unit, coupled to the switch unit and the interface unit for generating and thus transmitting a control signal according to the input mode and the at least one input signal;
a receiving end, for receiving the control signal, further comprising:
a receiving unit, for receiving the control signal generated from the remote control unit;
an operation unit, coupled to the receiving unit for analyzing the control signal into an operation signal; and
an interface connecting unit, for transmitting the operation signal to an electronic device.

In another exemplary embodiment, the present invention further provides an inertial sensing interactive system, comprising:
at least an input control apparatus, further comprising:
a switch unit, for selecting one input mode out of at least an input mode for the input control apparatus;
an interface unit, for generating at least an input signal according to the input mode selected by the switch unit;
an inertial sensing module, being configured with at least an inertial sensor, for sensing at least a control motion and thus correspondingly generating at least an inertial sensing parameter according to the input mode selected by the switch unit; and
a remote control unit, coupled to the switch unit, the interface unit and the inertial sensing module for generating and thus transmitting a control signal according to the input mode, the at least one input signal and the at least one inertial sensing parameter;
a receiving end, further comprising:
a receiving unit, for receiving the control signal generated from the remote control unit;
an operation unit, coupled to the receiving unit for analyzing the control signal into an operation signal; and
an interface connecting unit, for transmitting the operation signal to an electronic device.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 3 shows an input mode selection of the present invention.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
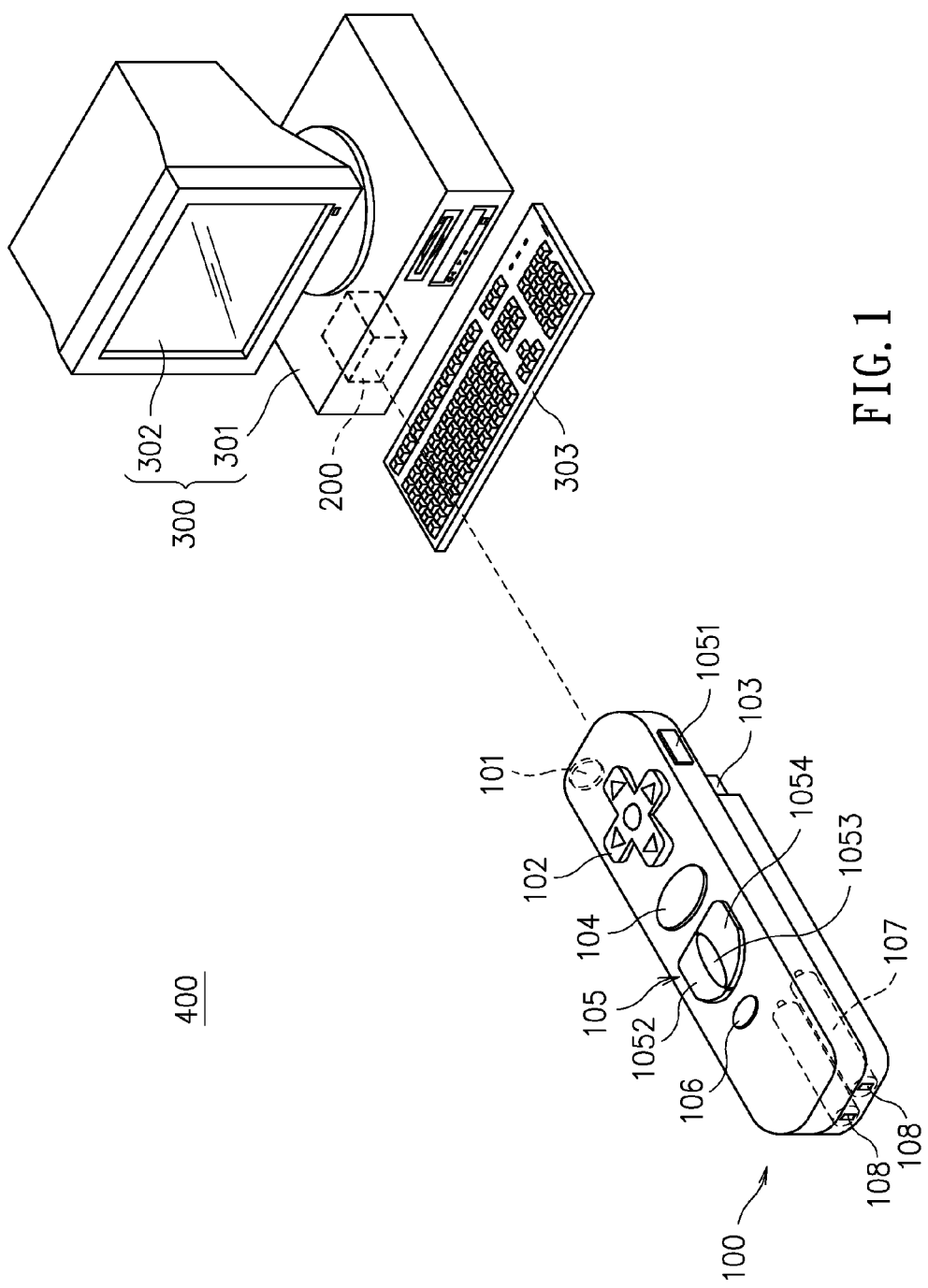
FIG. 1 shows an interactive system according to a first embodiment of the invention.

Please refer to FIG. 1, which shows an interactive system according to a first embodiment of the invention. In FIG. 1, an inertial sensing input control apparatus 100 forms an interactive system 400 together with a receiving end 200 and an electronic device 300, so that users of the interactive system 400 can use the inertial sensing input control apparatus 100 to interact with the electronic device 300 through the receiving end 200. In this embodiment, the electronic device 300 is a computer 301 with a display unit 302. Nevertheless, the electronic device can be an interactive gaming device, an interactive multimedia device, other game consoles with computation ability, or the like.

It is noted that the inertial sensing input control apparatus 100 can communicate with the receiving end 200 in a wireless manner. In FIG. 1, the receiving end 200 is disposed inside the computer 301 and is electrically connected to the computer 301 in either a wired or wireless manner. However, it can be disposed outside the computer and thus connected to the electronic device 300 through an interface connecting unit, such as PS/2 interface or USB interface. Moreover, the wireless communication between the inertial sensing input control apparatus 100 and the receiving end 200 is enabled by a way selected form the group consisting of Bluetooth communication and radio frequency (RF) communication, but is not limited thereby. As shown in FIG. 1, there is a power switch arranged at the front of the inertial sensing input control apparatus 100, and moreover, there are a plurality of press-keys arranged on a surface of the inertial sensing input control apparatus 100, such as the cross key 102, the front key 103, the key A 104, the control keypad 105 and the key B 106 shown in FIG. 1. It is noted that the control keypad 105 can be added or eliminated as required that it is not limited by this embodiment. An accommodation space is formed in the inertial sensing input control apparatus 100 for receiving a battery pack 107 to be used as the power supply of the inertial sensing input control apparatus 100. In addition, a charging interface 108 is from at an end of the inertial sensing input control apparatus 100 for charging the same therethrough. As methods for charging the inertial sensing input control apparatus 100 are known to those skilled in the art, and thus are not described further herein.

Figure 2:
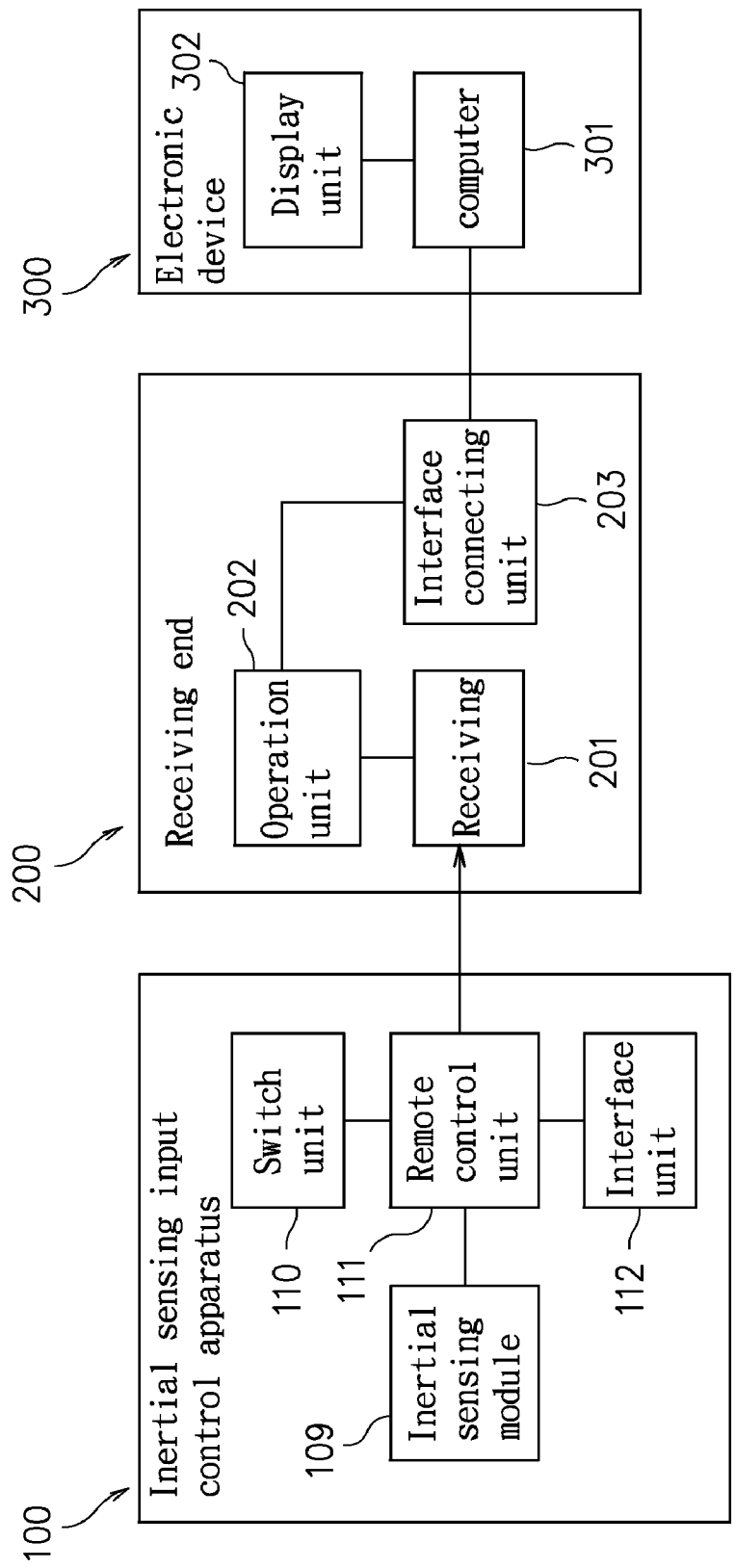
FIG. 2 is a schematic block diagram depicting the interactive system of the first exemplary embodiment.

Please refer to FIG. 2, which is a schematic block diagram depicting the interactive system of the first exemplary embodiment. The inertial sensing input control apparatus 100 comprises an inertial sensing module 109, a switch unit 110, a remote control unit 111 and an interface unit 112. The inertial sensing module 109, being configured with at least an inertial sensor, is used for sensing at least a control motion and thus correspondingly generating at least an inertial sensing parameter. It is noted that each inertial sensor can be a device selected from the group consisting of a gyroscope, an accelerometer, and the combination thereof. AS the inertial sensor is designed to detect the limb movements of a user, other than inside the inertial sensing module 109, each of which can be attached to a specific location of the user's body, such as the abdomen, the front arm, the leg, and so on, but is not limited thereby. In addition, the inertial sensing module 109 can either be arranged inside the inertial sensing input control apparatus 100, or outside the inertial sensing input control apparatus 100, whichever is electrically connected with the inertial sensing input control apparatus 100 by a wired manner or wireless manner.

In FIG. 2, the interface unit 112, used for generating at least an input signal, is electrically connected to the plural press-keys arranged on a surface of the inertial sensing input control apparatus 100 of FIG. 1, so that when any one key or any key combination is pressed, the interface unit 112 will receiving a signal corresponding to the key-pressing and then transmitting the signal to the remote control unit 111. Moreover, the switch unit 110 is electrically connected to the mode switch key 1051 of FIG. 1 so as to be used for selecting an input mode for the inertial sensing input control apparatus 100, in which the input mode is a mode selected from the group consisting of a mouse mode, a joystick mode, a keyboard mode and the combination thereof, but is not limited thereby.

The aforesaid input mode is defined with respect to the I/O protocol of different input interfaces. Taking the embodiment of FIG. 1 for example, as the keyboard 303 is used as the input unit of the electronic device 300, so that the computer 301 must be equipped with the I/O protocol for such keyboard. The remote control unit 111 is coupled to the inertial sensing module 109, the interface unit 112 and the switch unit 110 for enabling the remote control unit 111 to generate and thus transmit a control signal to the receiving end 200 according to the I/O protocol of the selected input mode, the at least one input signal and the at least one inertial sensing parameter. It is noted that the wireless communication of the remote control unit 111 with the receiving end 200 is enabled by a RFID means or a Bluetooth means.

AS shown in FIG. 2, the receiving end 200 comprises a receiving unit 201, an operation unit 202 and an interface connecting unit 203. The receiving unit 201 is used for receiving a control signal generated from the remote control unit and thus decoding the control signal into an inertial sensing parameter, at least an input signal and at least an I/O protocol. The operation unit 202 is coupled to the receiving unit 201 for analyzing the inertial sensing parameter into at least a motion signal while generating an operation signal according to the at least one input signal and the at least one I/O protocol. The interface connecting unit 203 is used for transmitting the operation signal and the at least one motion signal to the electronic device 300. Moreover, the communication between the interface connecting unit 203 and the electronic device 300 can be realized in a wired or wireless manner, in which the wireless communication can be enabled by Bluetooth or radio frequency communication, such as radio frequency identification (RFID) means; as the wired communication can be enabled by the use of an universal serial bus (USB) port, or other connection port, such as RS232 or SCSI, but is not limited thereby.

The communication between the inertial sensing input control apparatus and the receiving end is illustrated in FIG. 1 and FIG. 2. For instance, when a user playing a multimedia game or an interactive software on the interactive system 400 of FIG. 1, the inertial sensing input control apparatus 100 which can be held in one hand of the user is enabled to detect the movement of the hand by the inertial sensing module 109 configured therein and thus generate an inertial sensing parameter accordingly. In addition, during the proceeding of the multimedia game or interactive software, the user can enhance his/her interaction with the game and the user by the use of those press-keys formed on the inertial sensing input control apparatus 100, such as cross key 102, the key A 104 or the key B 106.

Furthermore, also during the proceeding of the multimedia game or interactive software, the user can use the mode selection key 1051 for directing the switch unit 110 to select an input mode for the inertial sensing input control apparatus 100. That is, the switch unit 110 is going to perform an evaluation to determine values of a mouse input flag, a joystick input flag and a keyboard input flag so as to select an input mode according to those flag values. Please refer to FIG. 3, which shows an input mode selection of the present invention. In an exemplary embodiment shown in FIG. 3, a plurality of input modes are defined with respected to different flag value combinations, that is, by assigning the aforesaid flags to be either 1 or 0, an input mode can be selected and used for transmitting data to the electronic device 300. For instance, when the mouse input flag is 0 while the joystick and keyboard input flags are both 1, the joystick+keyboard mode will be selected.

Figure 4:
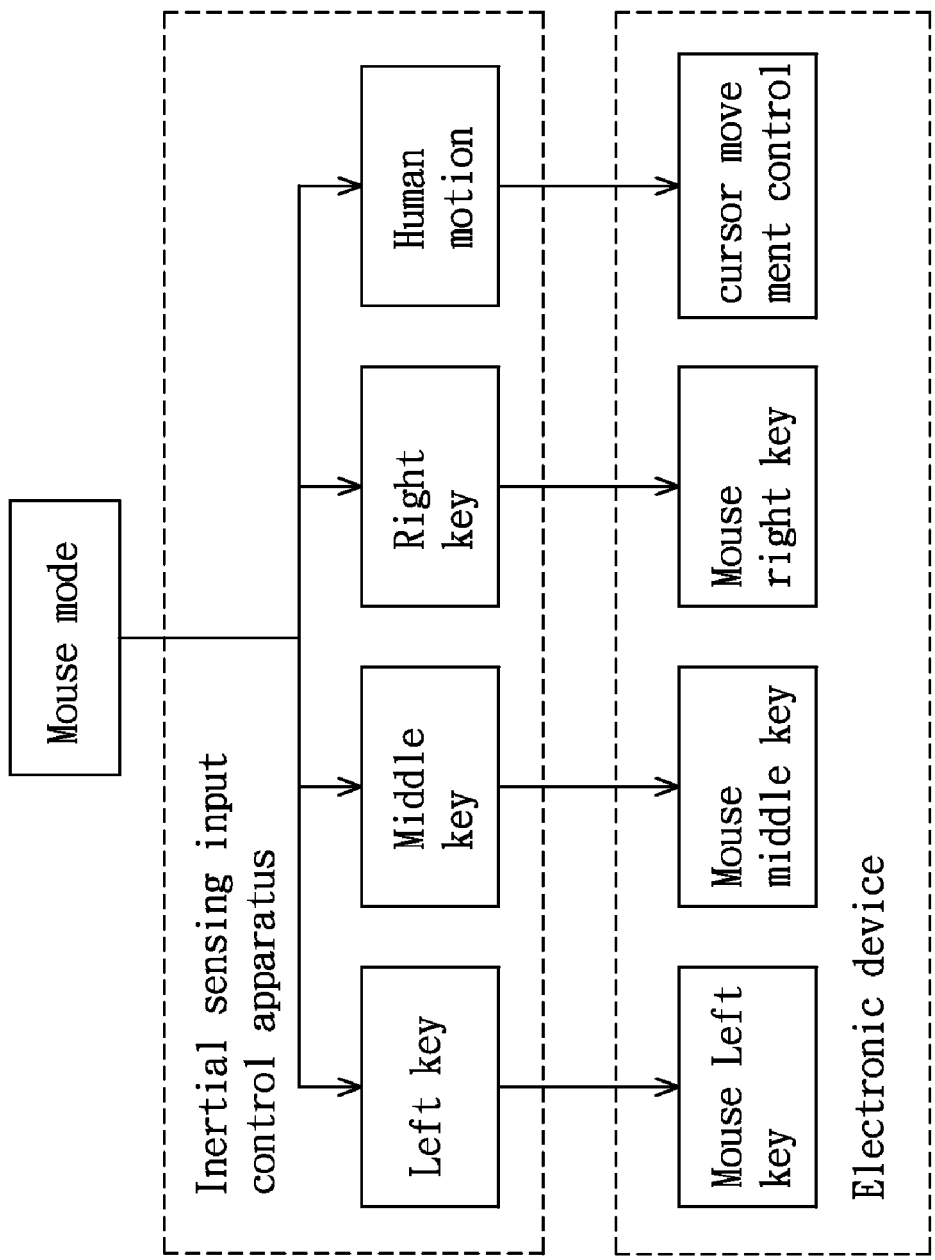
FIG. 4 is a schematic diagram illustrating how an input control apparatus of the invention is configured to imitate a computer mouse when the mouse mode of the input control apparatus is selected.

In the exemplary embodiment of FIG. 1 and FIG. 2, the mouse mode is selected for illustration. Please refer to FIG. 4, which is a schematic diagram illustrating how an input control apparatus of the invention is configured to imitate a computer mouse when the mouse mode of the input control apparatus is selected. As shown in FIG. 4, the inertial sensing input control apparatus 100 will mimic a computer mouse to interact with the electronic device 300. For instance, when the left key 1052 of the inertial sensing input control apparatus 100 is pressed, the electronic device 300 will respond just like the left key of a mouse is pressed, and that is the same to the middle key 1053 and the right key 1054. Moreover, when the inertial sensing input control apparatus 100 is moved, the cursor displayed in the display unit 302 of the electronic device 300 is going to move accordingly.

Figure 5:
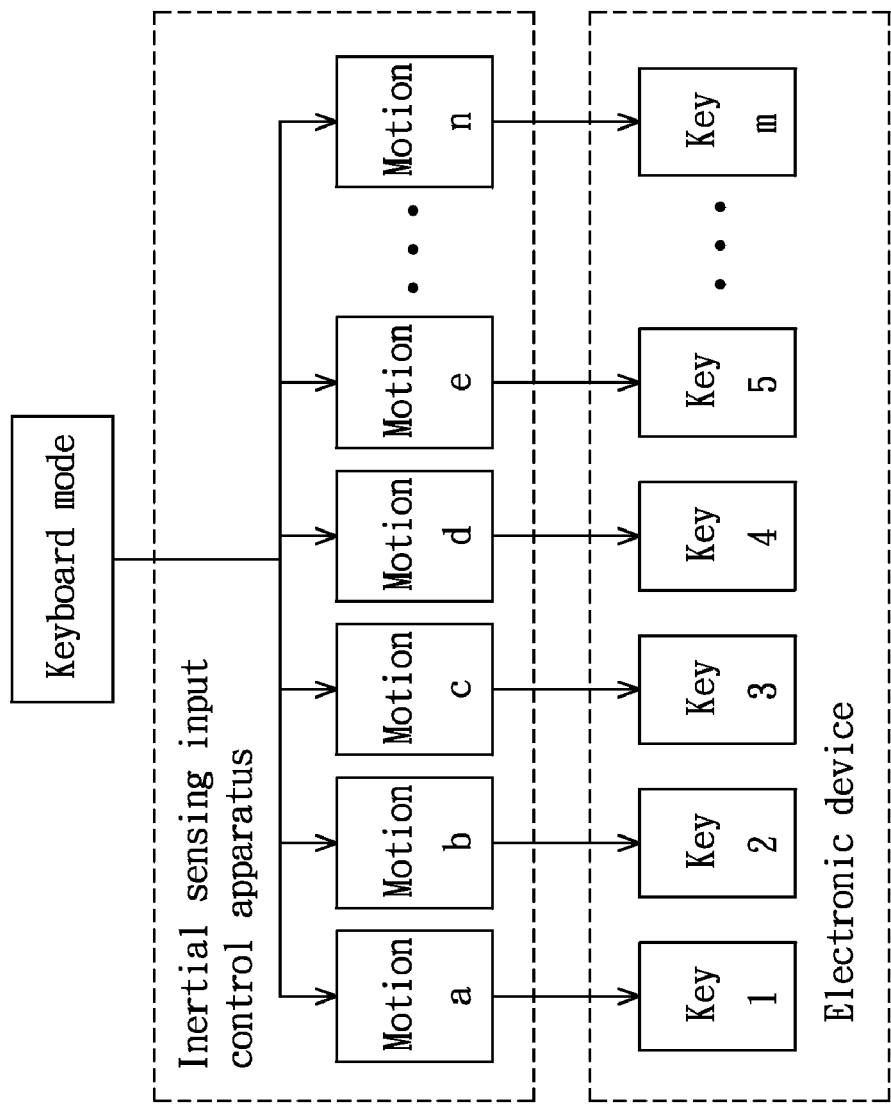
FIG. 5 is a schematic diagram illustrating how an input control apparatus of the invention is configured to imitate a keyboard when the keyboard mode of the input control apparatus is selected.
Figure 6:
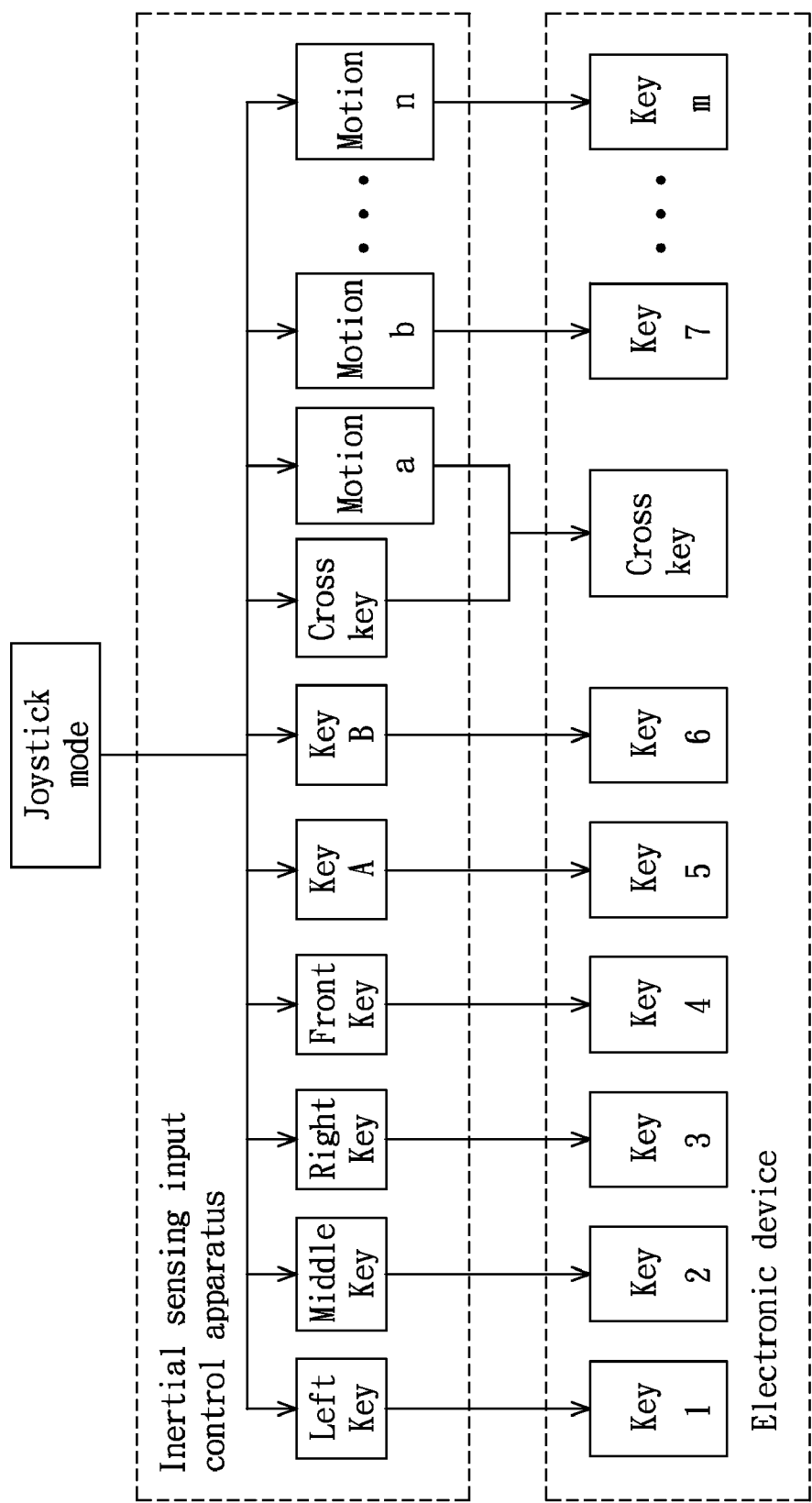
FIG. 6 is a schematic diagram illustrating how an input control apparatus of the invention is configured to imitate a joystick when the joystick mode of the input control apparatus is selected.

FIG. 5 is a schematic diagram illustrating how an input control apparatus of the invention is configured to imitate a keyboard when the keyboard mode of the input control apparatus is selected; and FIG. 6 is a schematic diagram illustrating how an input control apparatus of the invention is configured to imitate a joystick when the joystick mode of the input control apparatus is selected. As shown in FIG. 6, the inertial sensing input control apparatus 100 in such joystick mode can assign its press-keys and motions detected by the inertial sensing module thereof to correspond to different keys of a joystick. Similarly, as shown in FIG. 5, the inertial sensing input control apparatus 100 in such keyboard mode can assign various inertial sensing parameters to various motions detected by the inertial sensing module thereof and thus further to correspond to different keys of a keyboard.

Figure 7:
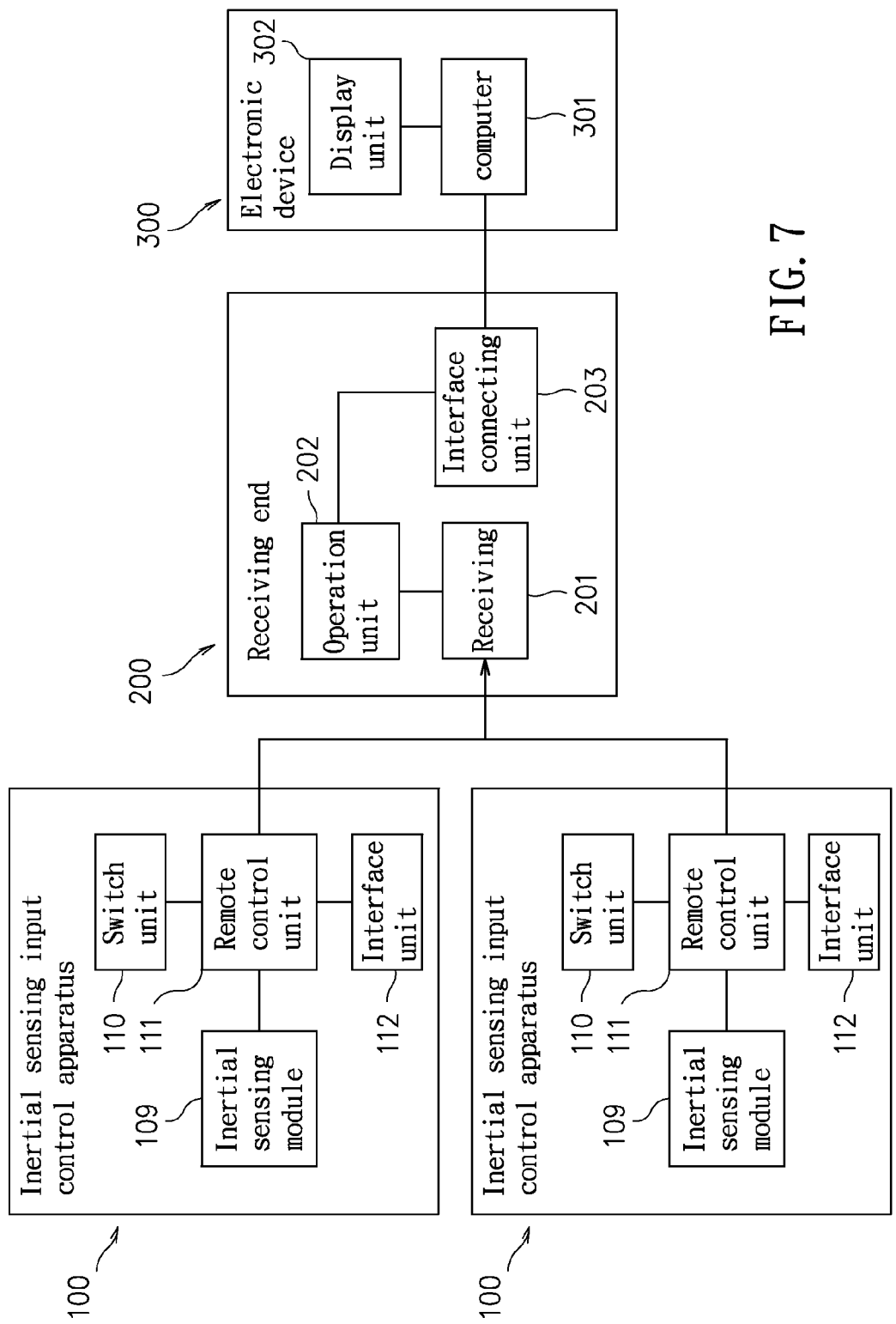
FIG. 7 shows an interactive system according to a second embodiment of the invention.

Please refer to FIG. 7, which shows an interactive system according to a second embodiment of the invention. Different from the first embodiment shown in FIG. 2, the interactive system has two inertial sensing input control apparatus 100 that are electrically connected with each other while each is capable of transmitting a control signal to the receiving end 200 through its remote control unit 111. As each inertial sensing input control apparatus 100 is equipped with its own switch unit 110, the two inertial sensing input control apparatus 100 can defined their respective interface units 112 to operate under different input modes. For instance, the two such input control apparatuses 100 can be integrated and acted as a left-hand unit and a right-hand unit of an integrated a handheld apparatus for meeting the control requirements of a comparatively more complicated game executing on the electronic device 300. In addition, the input control apparatuses 100 can be configured as independent devices to be operated by different users so that the number of the input control apparatuses is not limited to be two, and thus can be as many as the electronic device permitted.

To sum up, the inertial sensing input control apparatus is a device capable of imitating functions of various input devices, by which a user playing the interactive system will not need to shift between different input devices just for meeting different control requirements of the interaction. In addition, the inertial sensing input control apparatus is configured with an inertial sensing module for generating inertial sensing parameters corresponding to the motion of the input control apparatus, which can be configured to conform with various I/O protocols in respective, and thus enables the electronic device to act corresponding to those I/O protocols as soon as the receiving end receive such inertial sensing parameters. Moreover, a plurality of such inertial sensing input control apparatuses can be connected with each for meeting the control requirements of a comparatively more complicated game executing on the electronic device, or the control requirements of game required to be played by both hands.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inertial sensing input control apparatus with a plurality of simulated input modes, comprising:
    a switch unit having three registers and a single key, wherein the three registers are for holding three flag values, each flag value representing a mouse, a keyboard, and a joystick respectively, and the single key is for selecting one input mode out of said plurality of simulated input modes corresponding to the stored flag values for the input control apparatus;
    a first interface unit, for generating and transmitting at least an input signal according to the input mode selected by the switch unit;
    a second interface unit, for generating and transmitting at least another input signal according to the input mode selected by the switch unit;
    a first inertial sensing module, being configured with at least an inertial sensor, for generating at least an inertial sensing parameter for input simulation by sensing a sequence of motions of a first human body;
    a second inertial sensing module, being configured with at least another inertial sensor, for generating at least a second inertial sensing parameter for input simulation by sensing a sequence of motions of a second human body; and
    a remote control unit, coupled to the switch unit, the interface units, and the inertial sensing modules for generating and thus transmitting a control signal according to the input mode, the at least one input signal and the at least one inertial sensing parameter;
    wherein said plurality of simulated input modes are selected from the group consisting of a mouse mode, a joystick mode, a keyboard mode, and all combinations of modes thereof;
    wherein the first and second interface units generate respective input signals corresponding to a selected input mode of the inertial sensing input control apparatus, a defined combination of at least one pressed key of the inertial sensing input control apparatus actuated by at least one user, and the respective inertial sensing parameters generated by the first and second inertial sensing modules.

2. The inertial sensing input control apparatus of claim 1, wherein the first interface unit is coupled to at least an input unit; and the input unit is a device selected from the group consisting of a cross key, an assembly of a plurality of press buttons, and the combination thereof.

3. The inertial sensing input control apparatus of claim 1, further comprising:
    a receiving end, including:
        a receiving unit, for receiving the control signal generated from the remote control unit;
        an operation unit, coupled to the receiving unit for analyzing the control signal into an operation signal; and
        an interface connecting unit, for transmitting the operation signal to an electronic device;
        wherein, the electronic device is a device selected from the group consisting of a computer, an interactive gaming device and an interactive multimedia device.

4. The inertial sensing input control apparatus of claim 3, wherein the first interface unit is electrically connected to the electronic device by a means selected from the group consisting of a wired means and a wireless means; and the wired means is enabled by an interface selected form the group consisting of a PS/2 interface and an USB interface; and the wireless means is enabled by a way selected form the group consisting of Bluetooth communication and radio frequency (RF) communication.

5. The inertial sensing input control apparatus of claim 1, wherein each inertial sensor is a device selected from the group consisting of at least a gyroscope, at least an accelerometer, and the combination thereof.

6. The inertial sensing input control apparatus of claim 1, wherein each of the inertial sensing modules is used for sensing at least a control motion and thus correspondingly generating the at least one inertial sensing parameter according to the input mode selected by the switch unit.

7. An interactive system, comprising:
    a first inertial sensing input control apparatus with a plurality of first simulated input modes, comprising:

a first switch unit having first three registers and a first single key, wherein the first three registers are for holding three flag values, each flag value representing a mouse, a keyboard, and a joystick respectively, and the first single key is for selecting a first selected input mode out of said plurality of first simulated input modes corresponding to the stored flag values for the first input control apparatus;

a first interface unit, for generating and transmitting at least a first input signal according to the first selected input mode selected by the first switch unit;

a first inertial sensing module, being configured with at least an inertial sensor, for generating a first inertial sensing parameter for input simulation by sensing a sequence of motions of a first human body; and a first remote control unit, coupled to the first switch unit and the first interface unit for generating and thus transmitting a first control signal according to the first selected input mode and the at least one first input signal;

wherein the first interface unit generates the at least first input signal corresponding to the first selected input mode of the first inertial sensing input control apparatus, a defined combination of at least one pressed key of the first inertial sensing input control apparatus actuated by a user, and the first inertial sensing parameter generated by the first inertial sensing module;

wherein said plurality of first simulated input modes are selected from the group consisting of a mouse mode, a joystick mode, a keyboard mode, and all combinations of modes thereof;

a second inertial sensing input control apparatus with a plurality of second simulated input modes, comprising:

a second switch unit having second three registers and a second single key, wherein the second three registers are for holding three flag values, each flag value representing a mouse, a keyboard, and a joystick respectively, and the second single key is for selecting the second selected input mode out of said plurality of second simulated input modes corresponding to the stored flag values for the second input control apparatus;

a second interface unit, for generating and transmitting at least a second input signal according to the second selected input mode selected by the second switch unit;

a second inertial sensing module, being configured with at least another inertial sensor, for generating a second inertial sensing parameter for input simulation by sensing a sequence of motions of a second human body; and a second remote control unit, coupled to the second switch unit and the second interface unit for generating and thus transmitting a second control signal according to the second selected input mode and the at least one second input signal;

wherein the second interface unit generates the at least second input signal corresponding to the second selected input mode of the second inertial sensing input control apparatus, a defined combination of at least one pressed key of the second inertial sensing input control apparatus, actuated by a user, and the second inertial sensing parameter generated by the second inertial sensing module;

wherein said plurality of second simulated input modes are selected from the group consisting of a mouse mode, a joystick mode, a keyboard mode, and all combinations of modes thereof;

a receiving end, for receiving the control signals, comprising:

a receiving unit, for receiving the first control signal generated from the first remote control unit and the second control signal generated from the second remote control unit;

an operation unit, coupled to the receiving unit for analyzing the first control signal and the second control signal into an operation signal; and an interface connecting unit, for transmitting the operation signal to an electronic device;

wherein, the electronic device is a device selected from the group consisting of a computer, an interactive gaming device and an interactive multimedia device.

8. The interactive system of claim 7, wherein the first interface unit is coupled to at least an input unit; and the input unit is a device selected from the group consisting of a cross key, an assembly of a plurality of press buttons, and the combination thereof.

9. The interactive system of claim 7, wherein the first inertial sensing parameter is integrated by the first remote control unit into the first control signal generated therefrom.

10. The interactive system of claim 7, wherein each inertial sensor is a device selected from the group consisting of at least a gyroscope, at least an accelerometer, and the combination thereof.

11. The interactive system of claim 7, wherein at least the first or second interface unit is electrically connected to the electronic device by a means selected from the group consisting of a wired means and a wireless means; and the wired means is enabled by an interface selected form the group consisting of a PS/2 interface and an USB interface; and the wireless means is enabled by a way selected form the group consisting of Bluetooth communication and radio frequency (RF) communication.

12. The interactive system of claim 7, further comprises a third inertial sensing input control apparatus configured in the interactive system, the third inertial sensing input control apparatus is electrically connected with the first inertial sensing input control apparatus and the second inertial sensing input control apparatus.

* * * * *